(12) United States Patent
Kichima et al.

(10) Patent No.: US 6,868,323 B2
(45) Date of Patent: Mar. 15, 2005

(54) VEHICLE BRAKE CONTROL SYSTEM

(75) Inventors: Yutaka Kichima, Wako (JP); Makoto Bessho, Wako (JP); Katsuyuki Takei, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 18 days.

(21) Appl. No.: 10/197,223

(22) Filed: Jul. 17, 2002

(65) Prior Publication Data

US 2003/0033073 A1 Feb. 13, 2003

(30) Foreign Application Priority Data

Jul. 25, 2001 (JP) ........................................ 2001-224462

(51) Int. Cl.[7] ............................................. F16D 55/26
(52) U.S. Cl. ..................... 701/70; 188/2 R; 188/156; 188/162; 192/12 R; 303/123
(58) Field of Search ..................... 701/70, 96; 188/156, 188/158, 171, 170, 2, 2 D, 2 R, 356, 72.9, 73.37, 162, 72.8; 340/903, 901; 303/3, 20, 123; 192/12 R

(56) References Cited

U.S. PATENT DOCUMENTS

| | | | | |
|---|---|---|---|---|
| 5,590,744 A | * | 1/1997 | Belmond | 188/26.5 |
| 5,957,992 A | * | 9/1999 | Kiyono | 701/93 |
| 6,122,988 A | * | 9/2000 | Mosler et al. | 74/500 |
| 6,213,259 B1 | * | 4/2001 | Hanson et al. | 188/156 |
| 6,311,121 B1 | * | 10/2001 | Kuragaki et al. | 701/96 |
| 6,311,808 B1 | * | 11/2001 | Halasy-Wimmer et al. | 188/72.6 |
| 6,377,007 B1 | * | 4/2002 | Ozaki et al. | 318/432 |
| 6,386,338 B1 | * | 5/2002 | Powrozek | 188/156 |
| 6,405,838 B1 | * | 6/2002 | Shaw | 188/106 P |
| 6,459,182 B1 | * | 10/2002 | Pfann et al. | 310/77 |
| 6,459,980 B1 | * | 10/2002 | Tabata et al. | 701/70 |
| 2002/0066623 A1 | * | 6/2002 | Powrozek | 188/2 |
| 2002/0066626 A1 | * | 6/2002 | Gill et al. | 188/158 |
| 2002/0129999 A1 | * | 9/2002 | Peter | 188/162 |
| 2003/0047413 A1 | * | 3/2003 | Gierer | 192/219 |

* cited by examiner

Primary Examiner—Thomas G. Black
Assistant Examiner—Tuan C To
(74) Attorney, Agent, or Firm—Carrier, Blackman & Associates, P.C.; William D. Blackman; Joseph P. Carrier

(57) ABSTRACT

A vehicle brake control system includes an improved ACC system for controlling the operation of a brake actuator and a throttle actuator, based on a signal from a preceding vehicle detector such as a radar device, so that a subject vehicle tracks a preceding vehicle. After a regular brake device is actuated to stop the subject vehicle, an EPB ECU disengages the regular braking device and, instead, actuates an electrically initiated and mechanically maintained parking brake device, so as to temporarily maintain the subject vehicle in a stationary state. Once the electric parking brake device is initiated, its braking state is mechanically maintained even if the flow of current is cut off. Therefore, neither the regular brake device nor the electric parking device consume power while the vehicle is in a stationary state, thereby saving power and minimizing electrical heat generation.

4 Claims, 15 Drawing Sheets

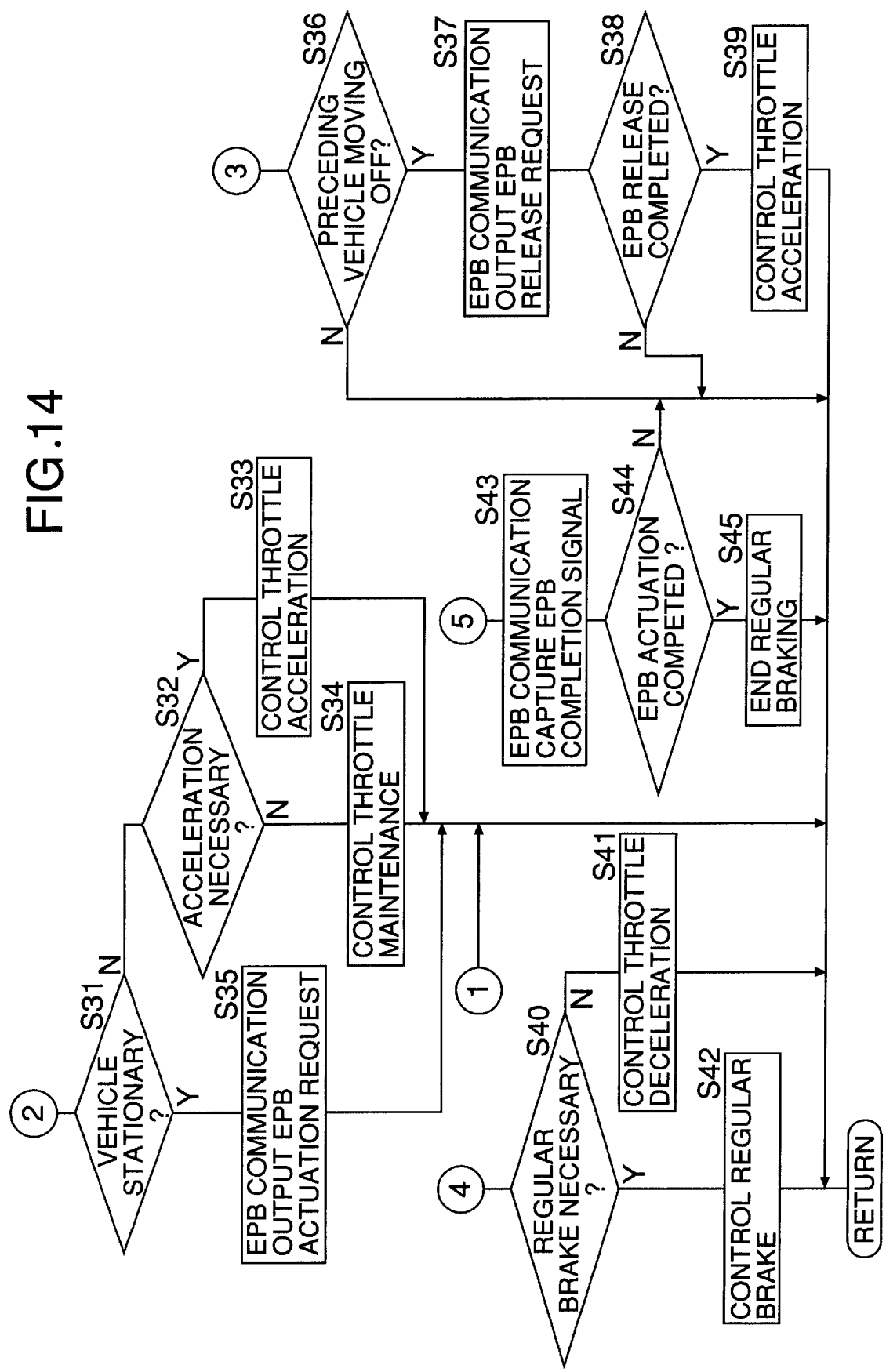

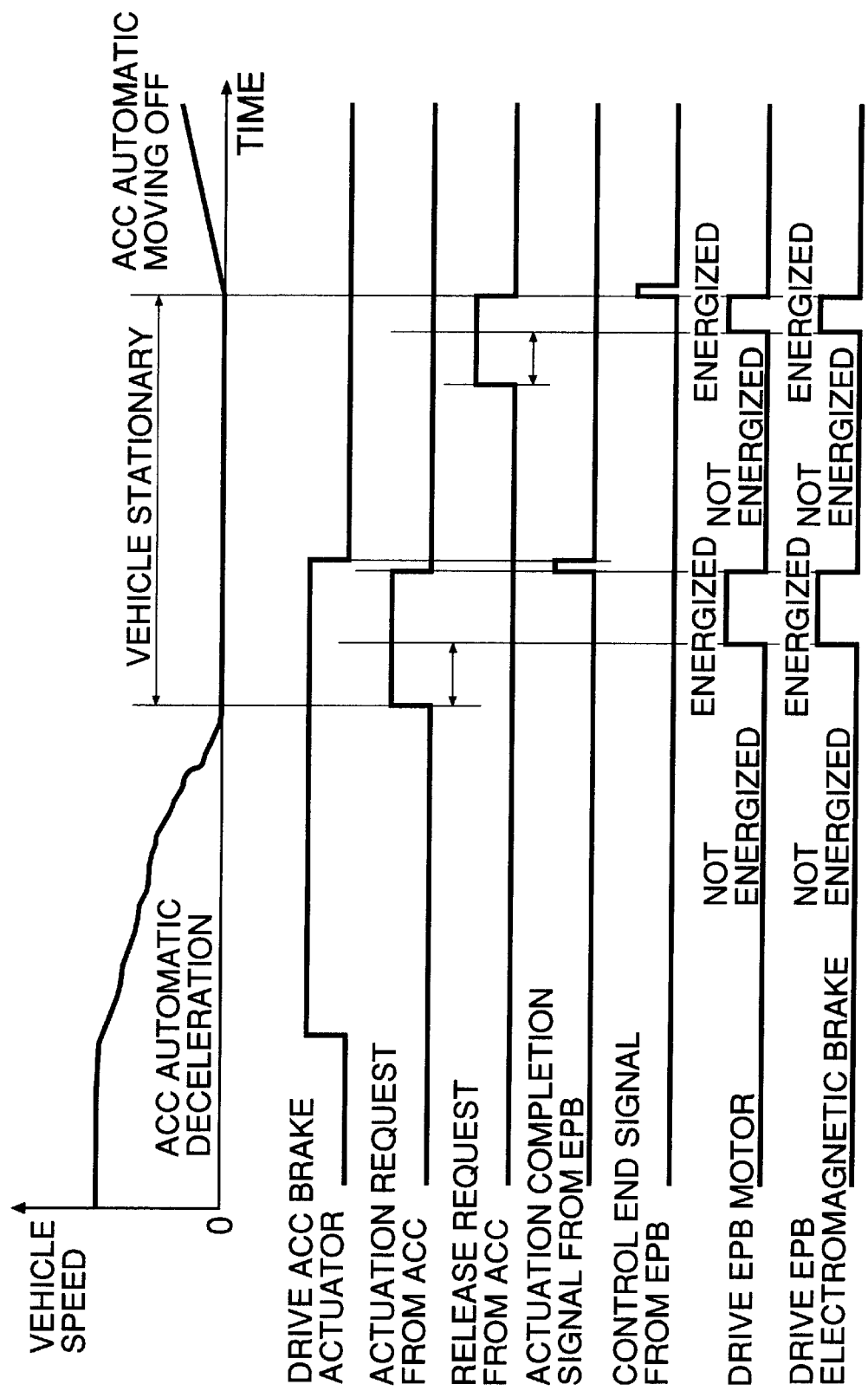

VEHICLE BRAKE CONTROL SYSTEM

BACKGROUND OF THE INVENTION

1. Field of the Invention

The present invention relates to a vehicle brake control system. More particularly, the present invention relates to a vehicle brake control system having brake control means for controlling the operation of a regular brake device, based on a following distance from a preceding vehicle.

2. The Prior Art

There is a known ACC (Adaptive Cruise Control) system that carries out constant speed travel control, for maintaining a set vehicle speed when there is no preceding vehicle. The known ACC system also provides constant following distance control for maintaining a set following distance from a preceding vehicle, when there is a preceding vehicle. In the known ACC system, during constant speed travel control, the vehicle is automatically accelerated when the actual vehicle speed, detected by vehicle speed detection means, becomes less than the set vehicle speed. Similarly, during constant following distance control, the vehicle is automatically accelerated by the known ACC system when the actual following distance from a preceding vehicle, detected by preceding vehicle detection means, such as a radar or camera, exceeds the set following distance. Conversely, when the actual vehicle speed exceeds the set vehicle speed, or when the actual following distance becomes less than the set following distance, the vehicle is automatically decelerated.

The following paragraph describes operation of a system given a congestion tracking function, in which the application region of the known ACC system is extended to a lower speed region during congestion, when a preceding vehicle is repeatedly stopping and starting.

When the preceding vehicle detected by the preceding vehicle detection means stops, using the known ACC system, the subject vehicle is automatically stopped to keep pace with the preceding vehicle, and when the preceding vehicle starts, the subject vehicle is automatically started to keep pace with the preceding vehicle.

The known ACC system, having the above-mentioned congestion tracking function, conventionally employs the following automatic braking means in order to automatically generate a braking force without a braking operation by a driver when the vehicle is stopped.

1. The degree of communication between a vacuum booster and the atmosphere is controlled by a solenoid valve, so as to increase the difference between atmospheric pressure and the vacuum booster pressure, thereby generating a brake fluid pressure in a master cylinder and supplying it to a brake cylinder.
2. A brake fluid pressure generated by an electric hydraulic pump is supplied to a brake cylinder via a solenoid valve.
3. A brake fluid pressure generated by an electric hydraulic pump is stored under pressure in an accumulator, and the brake fluid pressure is supplied to a brake cylinder via a solenoid valve.

However, the known braking means 1 to 3 require the solenoid valve and the electric hydraulic pump to be energized, not only when generating a brake fluid pressure, but also when maintaining the brake fluid pressure. This requirement of continuously energizing the solenoid valve and hydraulic pump can lead to problems of increased power consumption and heat generation in the solenoid valve, the electric hydraulic pump, and their controllers, thus degrading their durability.

If cooling means such as an electric heat-dissipating fan is provided in order to solve the problem of heat generation, there are provided new problems of an increase in cost, an increase in dimensions, and a further increase in the power consumption.

The present invention has been achieved in view of the above-mentioned circumstances, and it is an object of the present invention to save power while a vehicle is maintained in a stationary state, after the vehicle has been stopped by a regular brake device.

SUMMARY OF THE INVENTION

In order to achieve the above-mentioned object, in accordance with an aspect of the present invention, there is proposed a vehicle brake control system that includes brake control means for controlling the operation of a regular brake device based on a following distance from a preceding vehicle. The system according to the invention also includes an electric parking brake device for electrically generating a braking force, and then mechanically maintaining the braking force.

In a vehicle equipped with the system hereof, when maintaining the vehicle in a stationary state after the vehicle has been stopped, the brake control means suspends operation of the regular brake device and actuates the electric parking brake device.

In accordance with this arrangement, the brake control means for controlling the operation of the regular brake device based on the following distance from a preceding vehicle suspends operation of the regular brake device, and actuates the electric parking brake device, when maintaining the vehicle in a stationary state after the vehicle has been stopped. Since this electric parking brake device generates a braking force electrically, and then maintains the braking force mechanically while the vehicle continues to be in a stationary state, neither the regular brake device nor the electric parking brake device consume substantial electric power, thereby saving power and preventing electrical heat generation.

In an illustrative embodiment hereof, the brake control means of the present invention corresponds to an improved ACC system ECU 1 and an electric parking brake device ECU 21.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIGS. 1 to 15 show an illustrative embodiment of the present invention, in which:

FIG. 1 is a block diagram of a vehicle brake control system.

FIG. 2 is an overall plan view of a vehicle that includes an electric parking brake device.

FIG. 3 is a block diagram of a control system for the electric parking brake device.

FIG. 4 is a partially cutaway plan view of the electric parking brake device.

FIG. 5 is a cross section along line 5—5 in FIG. 4.

FIG. 6 is a cross section along line 6—6 in FIG. 5.

FIG. 7 is a cross section along line 7—7 in FIG. 5.

FIG. 8 is a cross section along line 8—8 in FIG. 7.

FIG. 9 is a diagram for explaining the action corresponding to FIG. 5.

FIG. 10 is a diagram for explaining the action corresponding to FIG. 8.

FIG. 11 is a first section of a flow chart for explaining the action of the electric parking brake device.

FIG. 12 is a second section of the flow chart for explaining the action of the electric parking brake device.

FIG. 13 is a first section of a flow chart for explaining the action of an ACC system.

FIG. 14 is a second section of the flow chart for explaining the action of the ACC system.

FIG. 15 is a time chart for explaining the actions of the ACC system and the electric parking brake device.

DETAILED DESCRIPTION

Figure 1:
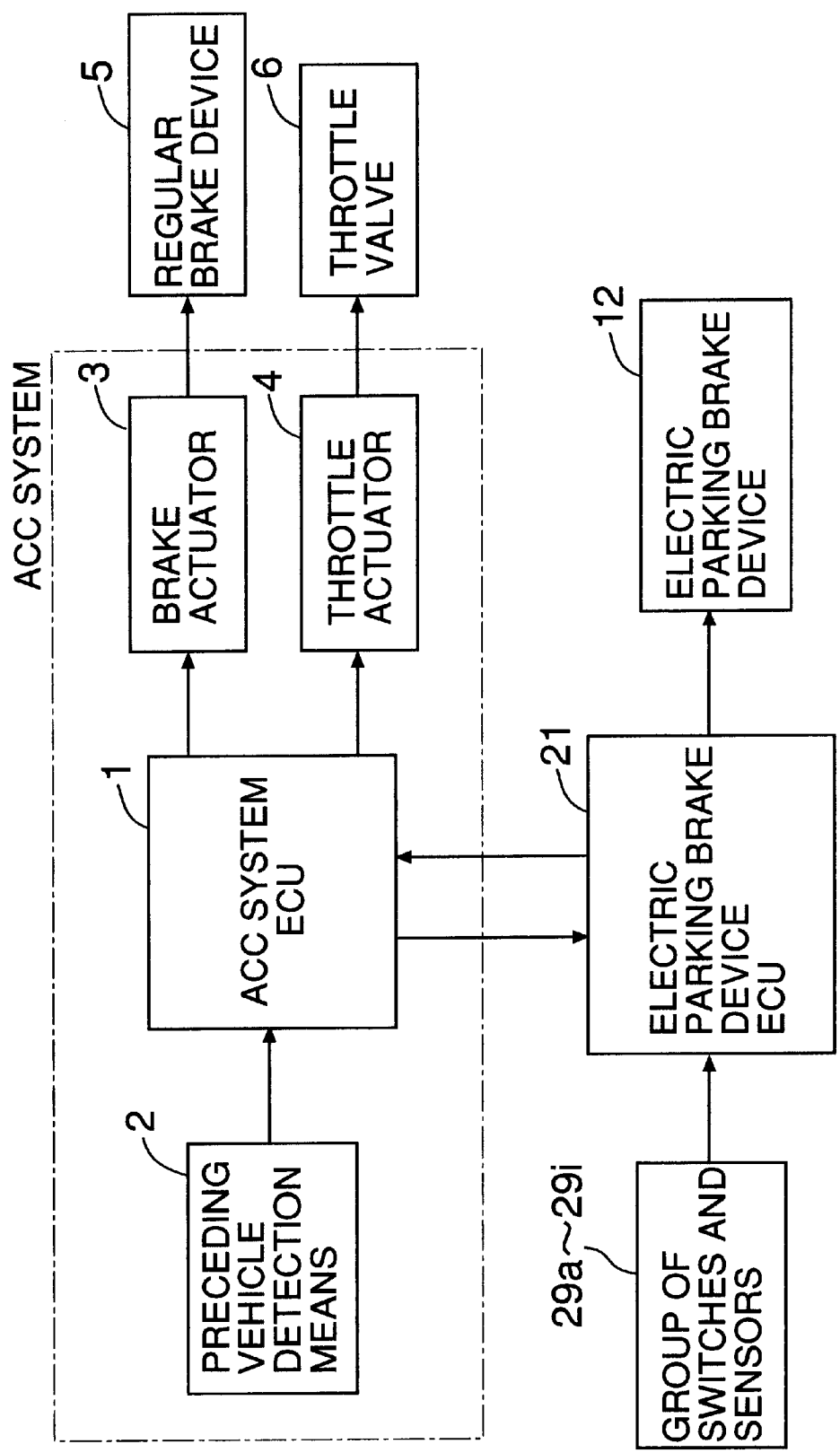

Referring to FIG. 1, a vehicle is equipped with an improved adaptive cruise control (ACC) system that includes a congestion tracking function according to the present invention. The system according to the present invention includes a adaptive cruise control system electronic control unit (ACC system ECU) 1, and an electric parking brake electronic control unit (EPB ECU) 21.

The improved ACC system ECU 1 controls the operation of a brake actuator 3 and a throttle actuator 4, based on a signal from a preceding vehicle detection means 2 which may include a milli-wave radar device, a laser radar device, a television camera, etc.

The brake actuator 3 controls the operation of a vehicle regular brake device 5, so as to automatically decelerate the vehicle as needed.

The throttle actuator 4 controls the operation of a vehicle throttle valve 6, so as to automatically accelerate and decelerate the vehicle as needed.

The EPB ECU 21 is in electrical communication with the ACC system ECU 1. The EPB ECU 21 controls the operation of an electric parking brake device 12 which will be described below, based on signals received from a group of switches and sensors 29a to 29i, which will be described below.

It will be understood that, although the ACC system ECU 1 and the EPB ECU 21 are shown separately in the drawings and are discussed separately herein for purposes of explanation, they could be physically separate units, or alternatively, they could be physically combined into a single vehicle control unit (not shown). This would depend on the particular application desired.

Figure 2:
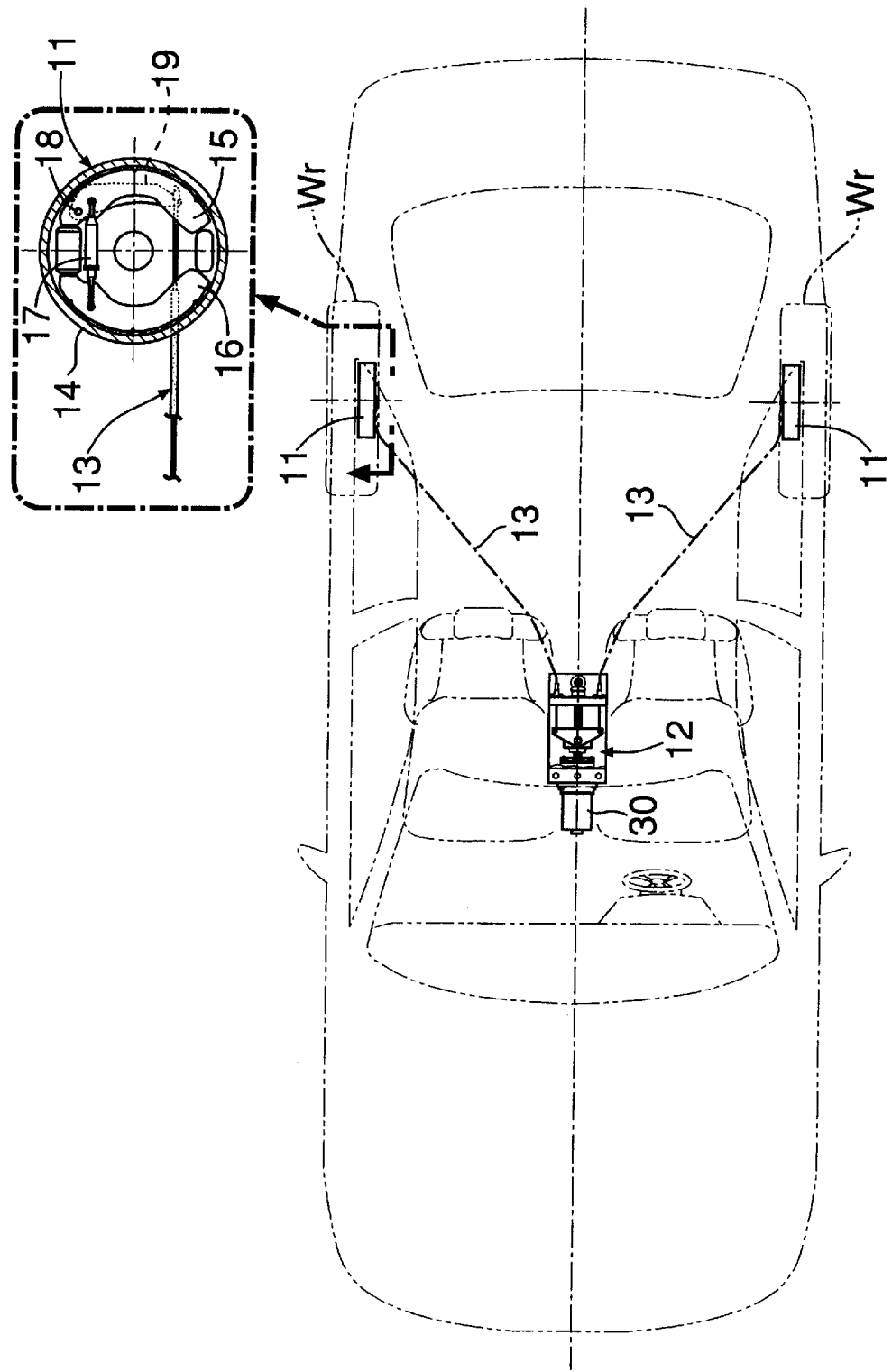

Referring to FIG. 2, drum type wheel brakes 11 are provided in left and right rear wheels Wr of the vehicle. The electric parking brake device 12 is disposed to the side of the driver's seat, and connected to the wheel brakes 11 via left and right Bowden wires 13.

Each of the wheel brakes 11 includes a brake drum 14, a pair of brake shoes 15 and 16 that can come into contact with the inner circumference of the brake drum 14, a link rod 17 that links the two brake shoes 15 and 16, and a lever 19. One end of the lever 19 is rotatably supported on one of the brake shoes 15 via a pin 18, and the other end is connected to the Bowden wire 13.

Pulling the Bowden wire 13, by means of an electric motor 30 provided in the electric parking brake device 12, rotates the lever 19 around the pin 18 in a clockwise direction in FIG. 2, thereby applying a compressive load to the link rod 17. The load presses the other brake shoe 16 leftward in FIG. 2 against the brake drum 14, and presses the brake shoe 15 rightward in FIG. 2 against the brake drum 14 via the link rod 17 and the pin 18, so that the wheel brake 11 generates a braking force. Conversely, when the Bowden wire 13 is slackened by the electric motor 30, the brake shoes 15 and 16 detach from the brake drum 14, thus releasing the braking force of the wheel brake 11.

Furthermore, since the electric parking brake device 12 is disposed to the side of the driver's seat, the occupant can manually actuate/release the operation thereof with ease.

In a situation where the electric motor 30 or its control system fails, the occupant can generate a braking force in the wheel brake 11 and release the braking force by a manual operation. Furthermore, it is possible to prevent the Bowden wires 13 extending from the electric parking brake device 12 to the wheel brakes 11 from bending sharply, thereby reducing transmission loss of the brake operation force.

Figure 3:
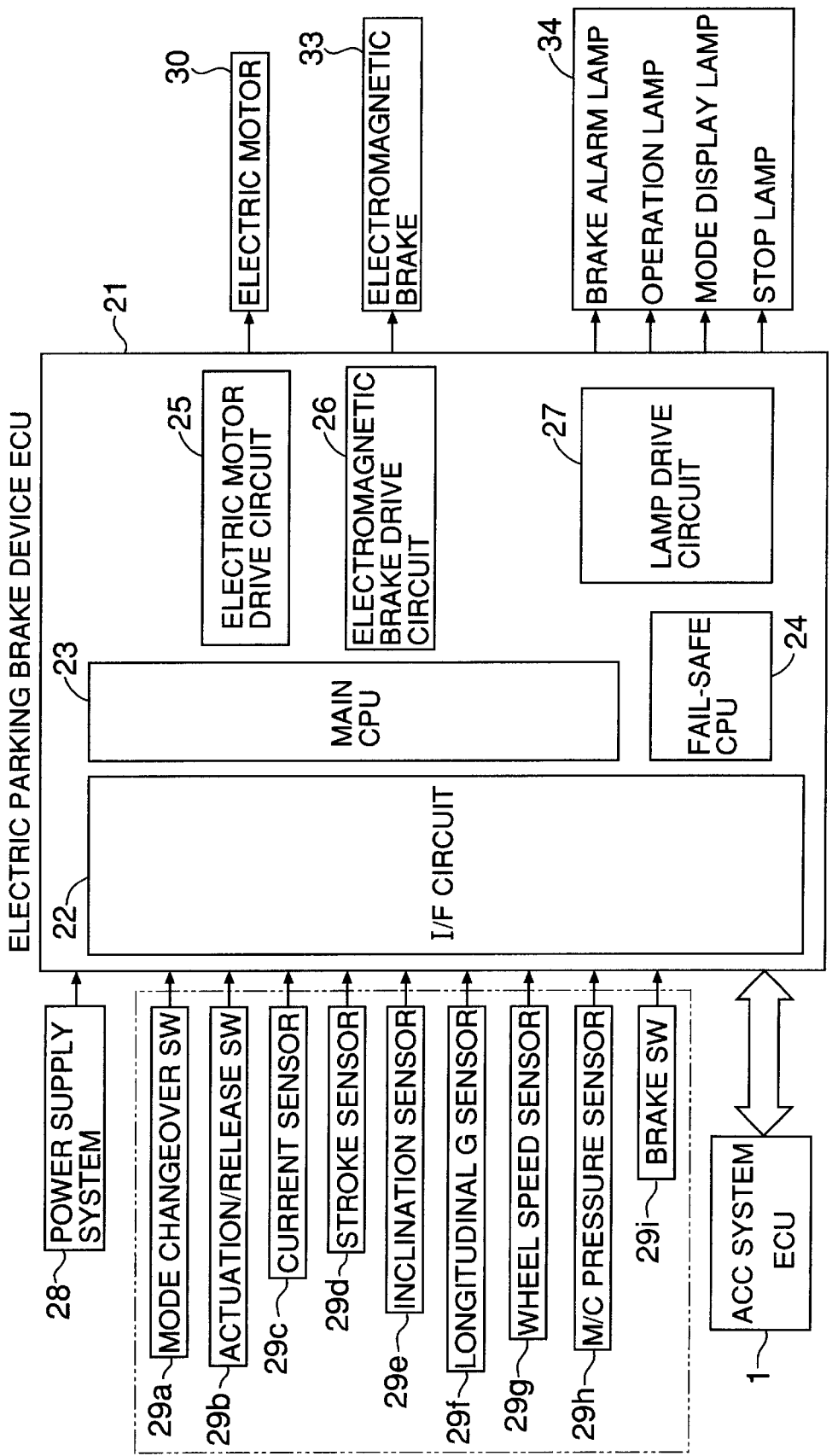
Figure 4:
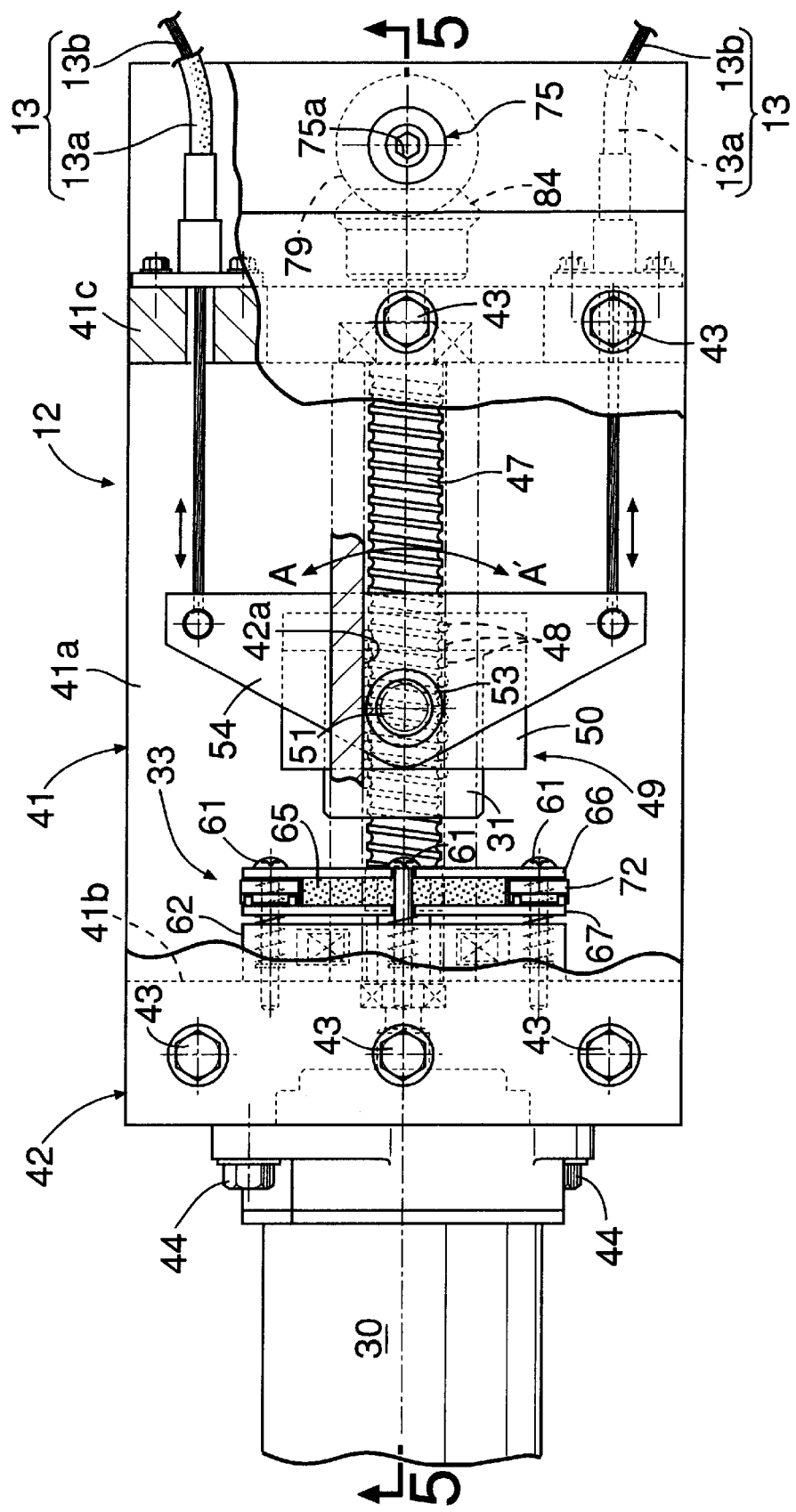

As shown in FIG. 3, the EPB ECU 21, for controlling the operation of the electric parking brake device 12, includes an interface circuit 22, a main CPU 23, a fail-safe CPU 24, an electric motor drive circuit 25, an electromagnetic brake drive circuit 26, and a lamp drive circuit 27. Electricity is supplied from a power supply system 28 to the EPB ECU 21. Connected to the interface circuit 22 are a mode changeover switch 29a for changing over between an auto mode and a manual mode, an actuate/release switch 29b for actuating and releasing operation of the electric parking brake device 12 by a switching operation when the manual mode is selected, a current sensor 29c for detecting current flowing in the electric motor 30, a stroke sensor 29d for detecting the position of a nut 31 which will be described below, an inclination sensor 29e for detecting the inclination in the longitudinal direction of a road surface on which the subject vehicle is present, a longitudinal acceleration sensor 29f for detecting the longitudinal acceleration of the subject vehicle, a wheel speed sensor 29g for detecting the forward and reverse wheel speeds, a master cylinder pressure sensor 29h for detecting the master cylinder pressure of a hydraulic brake system, and a brake switch 29i for detecting the operation of a brake pedal.

Input into the interface circuit 22 of the EPB ECU 21 is a signal from the ACC system ECU 1, together with various signals relating to the degree of opening of an accelerator, a shift position, a brake control signal, etc. from external ECUs such as a fuel injection system, an automatic transmission, an anti-lock brake system, and a vehicle stability assist system. The electric motor drive circuit 25 is connected to the electric motor 30, the electromagnetic brake drive circuit 26 is connected to an electromagnetic brake 33, which will be described below, and the lamp drive circuit 27 is connected to lamps such as a brake alarm lamp, an operation lamp, a mode display lamp, and a stop lamp.

The structure of the electric parking brake device 12 is now explained by reference to FIGS. 4 to 8.

A housing 41 forming the main part of the electric parking brake device 12 includes a base wall 41a positioned horizontally, a front rising wall 41b rising from the forward end of the base wall 41a, and a rear rising wall 41c rising from the vicinity of the rear end of the base wall 41a. The front and rear ends of an upper cover 42 are fixed to the upper face of the front rising wall 41b and the upper face of the rear rising wall 41c respectively by means of a plurality of bolts 43. The electric motor 30 is fixed to the front face of the front rising wall 41b of the housing 41 by means of a plurality of bolts 44 so that an output shaft 30a of the electric motor 30 faces rearward.

A screw shaft 47 is supported in the front rising wall 41b and the rear rising wall 41c via ball bearings 45 and 46 respectively. The output shaft 30a of the electric motor 30 is connected to the forward end of the screw shaft 47.

Figure 5:
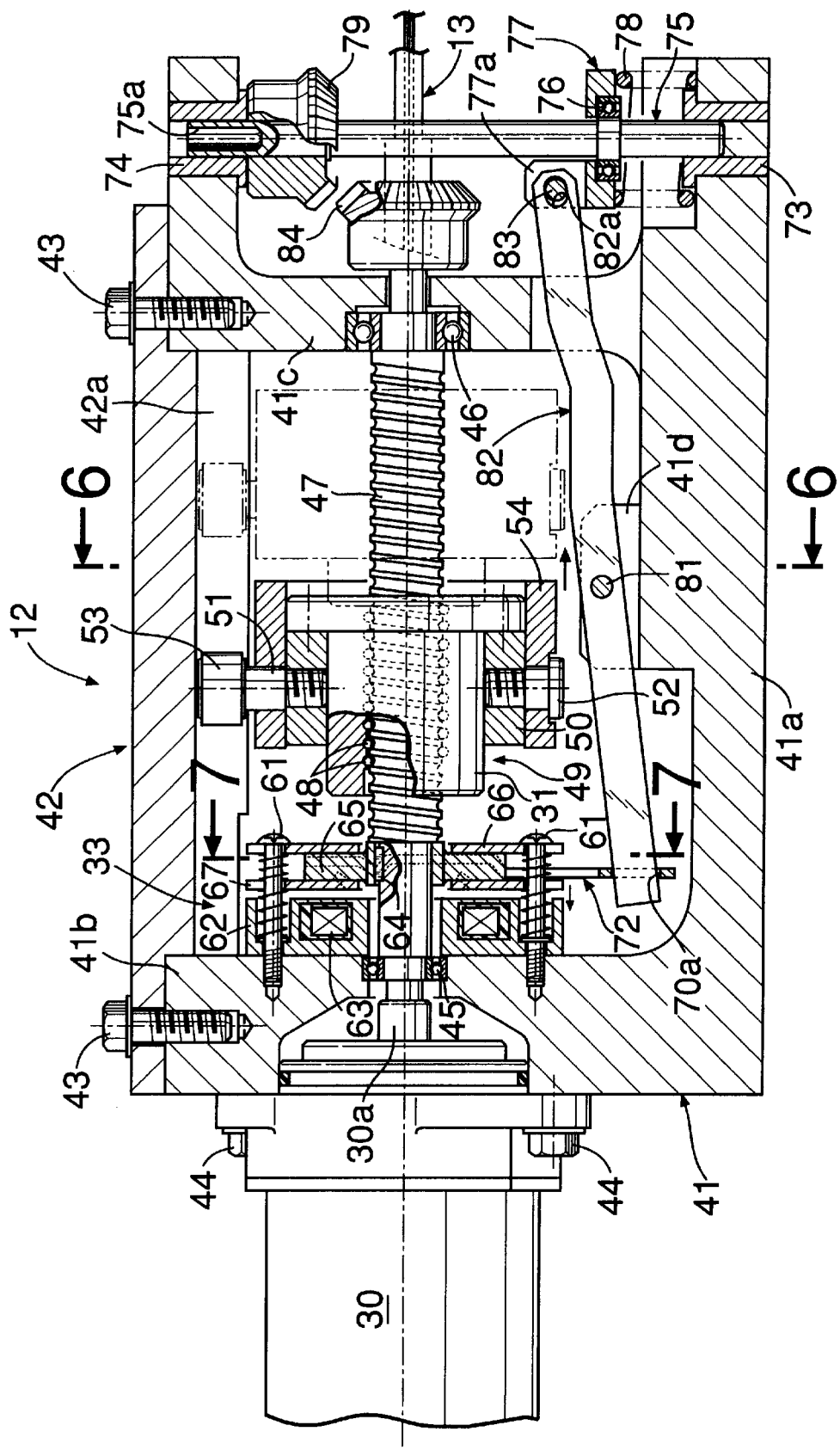

As seen best in FIG. 5, a nut 31 is rotatably and threadably meshed around the outer circumference of the screw shaft 47, via a large number of balls 48, which are interposed between the nut 31 and the screw shaft 47. The screw shaft 47, balls 48, and nut 31 form a ball screw mechanism 49.

A collar 50 is press-fitted around the outer circumference of the nut 31. Fixed to the upper face and the lower face of the collar 50 are an upper support rod 51 and a lower support rod 52 extending in the vertical direction. A guide roller 53 rotatably supported on the upper end of the upper support rod 51 is movably fitted in a guide groove 42a (FIG. 6) formed in the longitudinal direction in the lower face of the upper cover 42, thereby effectively preventing rotation of the ball screw mechanism 49.

An equalizer 54, having an elliptical cross section, is disposed so as to surround the outer circumference of the nut 31. The equalizer 54 is supported by the upper support rod 51 and the lower support rod 52 in a laterally pivotable manner.

The Bowden wires 13 are formed from outer tubes 13a and inner cables 13b housed within the outer tubes 13a in a relatively movable manner. The forward ends of the outer tubes 13a are fixed to the rear face of the rear rising wall 41c. The forward ends of the inner cables 13b run through the rear rising wall 41c, and are fixed to opposite ends on the left and right of the equalizer 54.

Figure 6:
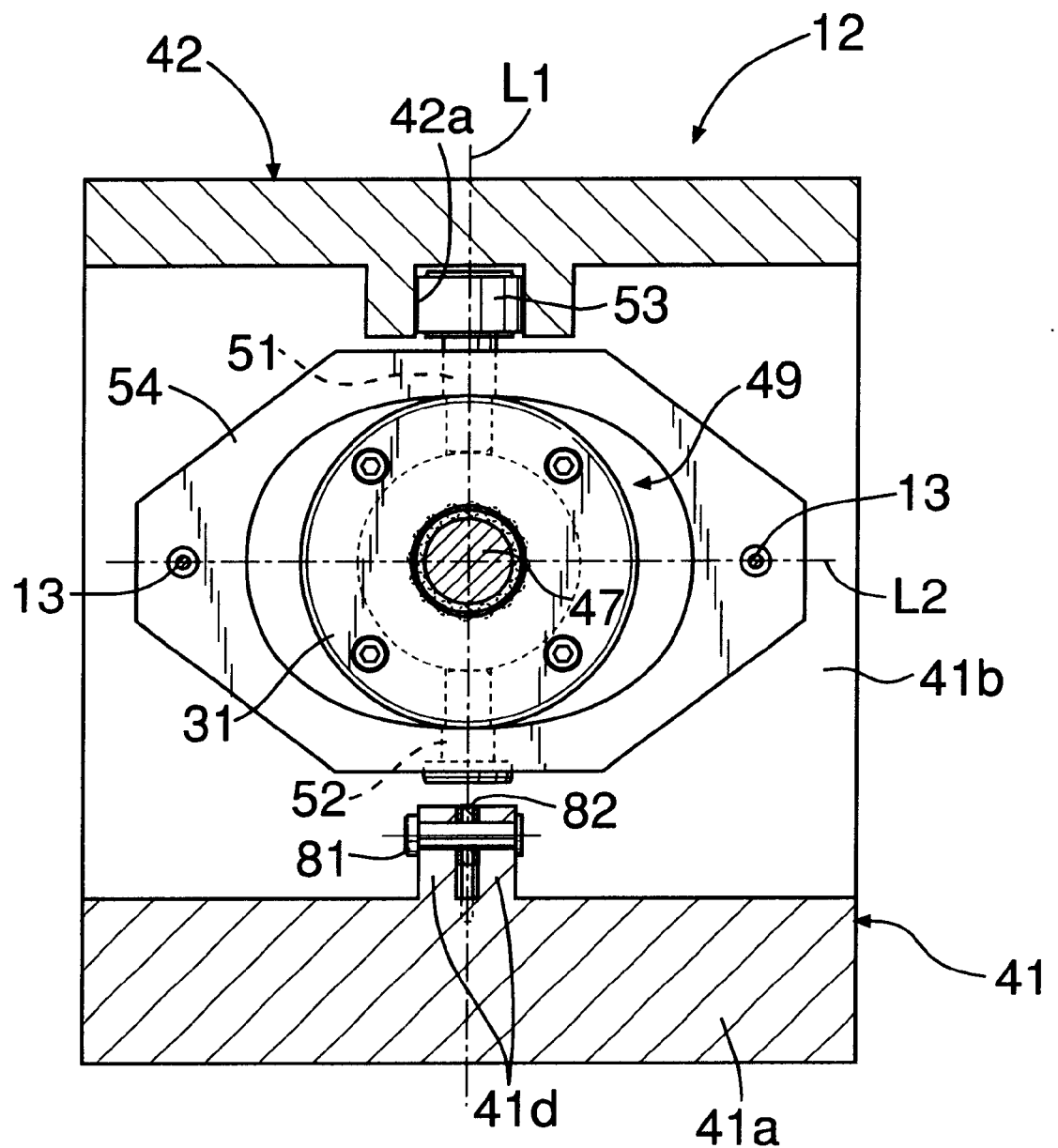
Figure 7:
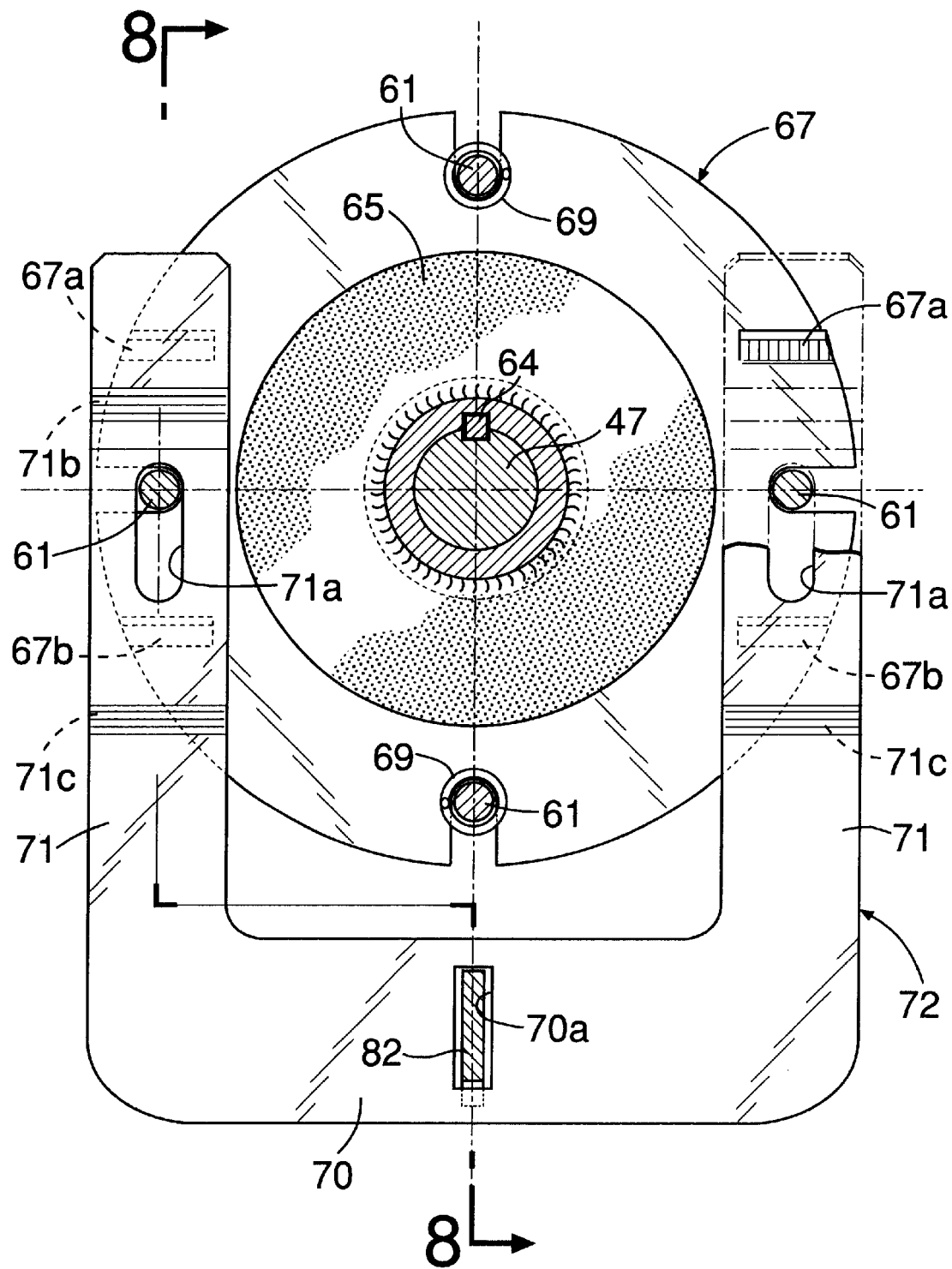

As is clear from FIG. 6, the axis L1 of the upper support rod 51 and the lower support rod 52 extends vertically and runs through the center of the screw shaft 47. A straight line L2 linking the connecting parts where the pair of Bowden wires 13 are connected to the equalizer 54 extends horizontally and runs through the center of the screw shaft 47. If the axis L1 is displaced laterally from the center of the screw shaft 47, the screw shaft 47 receives a biased load and is bent in a direction perpendicular to a plane that includes the axis L1 (i.e., bent in the lateral direction) due to the load from the Bowden wires 13. If the straight line L2 is displaced vertically from the center of the screw shaft 47, the screw shaft 47 receives a biased load and is bent in a direction perpendicular to a plane that includes the straight line L2 (i.e., bent in the vertical direction) due to the load from the Bowden wires 13.

However, in accordance with the present embodiment, since both the axis L1 and the straight line L2 run through the center of the screw shaft 47, it is possible to prevent a biased load from being imposed on the screw shaft 47 so as to bend it, and the ball screw mechanism 49 can be operated smoothly. Furthermore, since the guide roller 53 is supported by utilizing the upper support rod 51, the number of parts can be reduced.

The electromagnetic brake 33 includes a core 62 fixed to the rear face of the front rising wall 41b by four bolts 61, a coil 63 housed within the core 62, and a rotor 65, fixed to a front part of the screw shaft 47 by a key 64 and positioned on the rear side of the core 62. The electromagnetic brake 33 also includes a plate 66 supported by the four bolts 61 in a longitudinally movable manner, and disposed between the rear face of the rotor 65 and heads 61a of the bolts 61. The electromagnetic brake 33 further includes an armature 67 supported by the four bolts 61 in a longitudinally movable manner and disposed between the rear face of the core 62 and the front face of the rotor 65.

A plurality of first coil springs 68 and second coil springs 69 are also provided as another component of the electromagnetic brake 33. The first and second coil springs 68, 69 are respectively supported around the outer circumference of each of the two bolts 61 at the top and bottom. The first coil springs 68, which are disposed between a recess 62a of the core 62 and the armature 67, bias the armature 67 in a direction such that it makes contact with the front face of the rotor 65. The second coil springs 69, which are disposed between the armature 67 and the plate 66, bias the armature 67 and the plate 66 in directions away from the front and rear faces of the rotor 65. Only the first coil springs 68 are supported around the outer circumferences of the two bolts 61 on the left and right, and the second coil springs 69 are not supported so as to avoid interference with long holes 71a of arm parts 71 of a releasing member 72 which will be described below.

The biasing force of the first coil springs 68 is set so as to be stronger than the biasing force of the second coil springs 69. Consequently, when the coil 63 is demagnetized, due to the biasing force of the first coil springs 68, the rotor 65 is clamped between the armature 67 and the plate 66, thereby restraining rotation of the screw shaft 47.

When the coil 63 is electrically excited, the armature 67 is then attracted to the core 62 against the biasing force of the first coil springs 68, and the armature 67 and the plate 66 are moved away from the rotor 65 by the biasing force of the second coil springs 69, thereby allowing the screw shaft 47 to rotate.

The releasing member 72 is formed into a U-shape including a base part 70 that extends laterally, and two arm parts 71 that extend upward from opposite ends of the base part 70. The releasing member 72 is disposed between the plate 66 and the armature 67. The two bolts 61 on the left and right run through the vertically elongated long holes 71a formed in the left and right arm parts 71, and guide the releasing member 72 in a vertically movable manner. Upper and lower inclined surfaces 71b and 71c are formed on each of the arm parts 71 of the releasing member 72 on the side facing the armature 67. Upper and lower inclined surfaces 67a and 67b that can come in contact with the inclined surfaces 71b and 71c are formed on the armature 67. When the releasing member 72 is in a descended position shown in FIGS. 7 and 8, the inclined surfaces 71b; 71c of the releasing member 72 are separated from the inclined surfaces 67a; 67b of the armature 67.

A plain bearing 73 is provided in the rear end of the base wall 41a of the housing 41, and a plain bearing 74 is provided in the rear end of the rear rising wall 41c of the housing 41. The plain bearings 73 and 74 support a rotating shaft 75 in a vertically movable and rotatable manner. A coil spring 78 is disposed between the base wall 41a of the housing 41 and a spring seat 77 supported on a lower part of the rotating shaft 75 via a ball bearing 76. The rotating shaft 75 is biased upward by the biasing force of the coil spring 78 and stops at a position such that a drive bevel gear 79 fixed to an upper part of the rotating shaft 75 is in contact with the lower face of the plain bearing 74 provided in the rear end of the rear rising wall 41c of the housing 41. Axially formed in the upper end of the rotating shaft 75 is a hexagonal hole 75a for receiving a hexagonal wrench 80 (see FIG. 9).

A bracket 41d is provided in a middle part of the base wall 41a of the housing 41, and supports a middle part of a lever 82 via a laterally extending pin 81 so that the lever 82 can swing vertically. A laterally extending pin 83 is fixed to a bracket 77a provided on the upper face of the spring seat 77 and is fitted in a longitudinally elongated long hole 82a formed in the rear end of the lever 82. The forward end of the lever 82 is fitted in a vertically elongated long hole 70a formed in the base part 70 of the releasing member 72.

A driven bevel gear 84 is fixed to the rear end of the screw shaft 47 that runs rearward through the rear rising wall 41c. When the rotating shaft 75 is in an ascended position due to the biasing force of the coil spring 78, the drive bevel gear 79 of the rotating shaft 75 and the driven bevel gear 84 of the screw shaft 47 are not meshed with each other, but when the rotating shaft 75 descends against the biasing force of the coil springs 78, the drive bevel gear 79 and the driven bevel gear 84 can mesh with each other.

Operation of the Electric Brake

Next, the operation of the depicted embodiment of the present invention, having the above-mentioned arrangement, is explained.

When the electric parking brake device 12 is not actuated, the nut 31 of the ball screw mechanism 49 is in a rear position shown by the broken line in FIG. 5, and the equalizer 54 supported by the nut 31 is also moved rearward, thus slacking the Bowden wires 13. At this point, the coil 63 of the electromagnetic brake 33 is not excited, and the biasing force of the first coil springs 68 clamps the rotor 65 between the armature 67 and the plate 66, thereby restraining the screw shaft 47, integral with the rotor 65, from being rotated arbitrarily by any external force.

Figure 8:
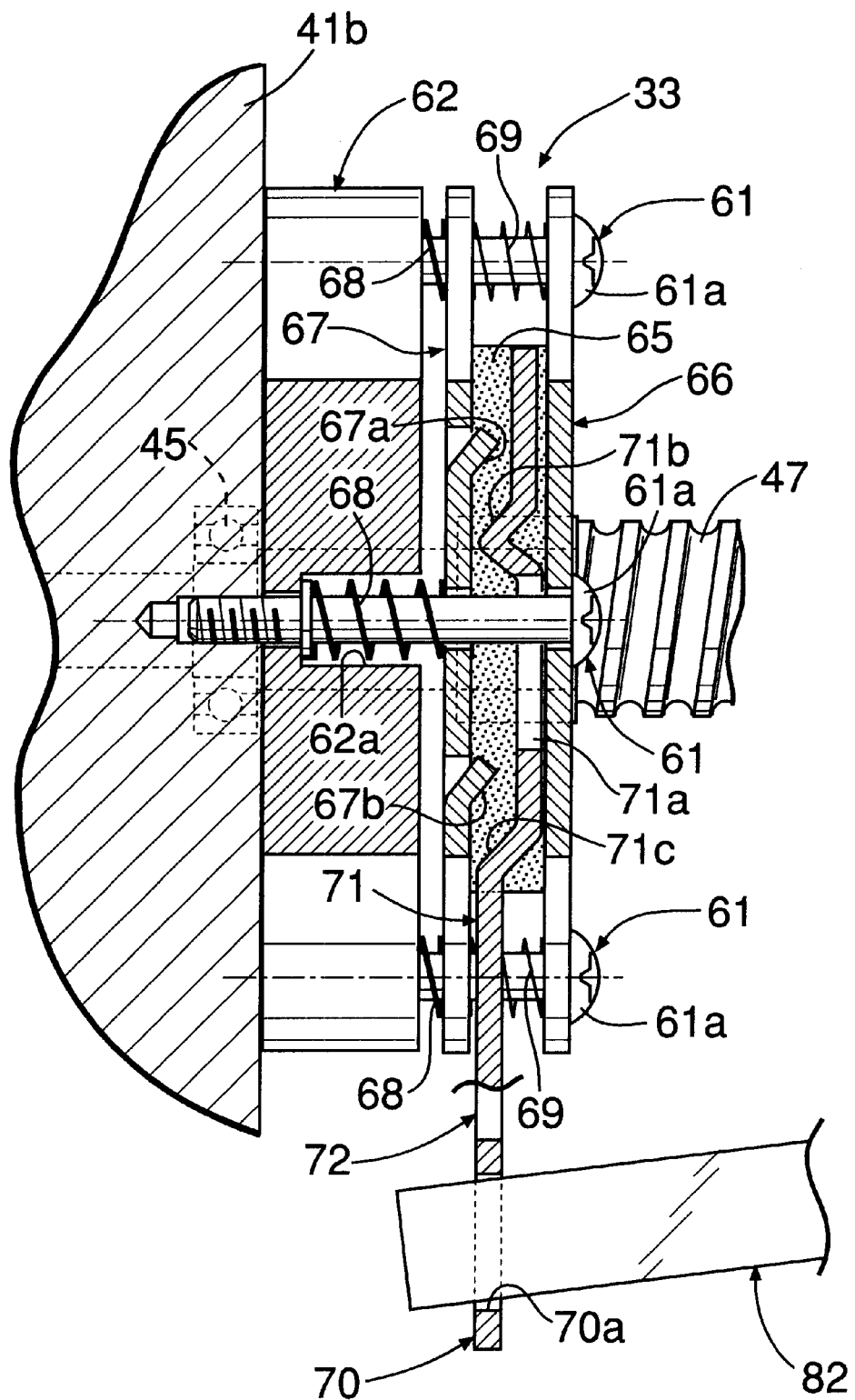

Furthermore, in the default position thereof, since the rotating shaft 75 is maintained in an upward, first position (see FIG. 5) due to the biasing force of the coil spring 78, the meshing between the drive bevel gear 79 and the driven bevel gear 84 is released, and the releasing member 72 is in a descended, non-actuated position (see FIG. 8).

In this state, when the EPB ECU 21 outputs a command to actuate the electric parking brake device 12, the coil 63 of the electromagnetic brake 33 is first excited, the core 62 thus attracts the armature 67, and the armature 67 and the plate 66 become detached from the rotor 65, thereby releasing the restraint on the screw shaft 47.

At the same time, the electric motor 30 is driven, and screw shaft 47 of the ball screw mechanism 49 rotates, so as to advance the nut 31 from the position shown by the broken line to the position shown by the solid line in FIG. 5. Tensions are thus generated in the left and right Bowden wires 13 connected to the equalizer 54 which advances integrally with the nut 31, thereby actuating the left and right wheel brakes 11. At this point, if the tensions of the left and right Bowden wires 13 are imbalanced, the equalizer 54 swings in the direction of arrows A-A' in FIG. 4 around the upper support rod 51 and the lower support rod 52, thus equalizing the tensions of the left and right Bowden wires, and generating the same amount of braking force in each of the left and right wheel brakes 11.

As hereinbefore described, since the driving force of the electric motor 30 is transmitted to the Bowden wires 13 via the ball screw mechanism 49 that can transmit the driving force reversibly, the reaction force of the brake operation force acting on the Bowden wires 13 (that is, the tensions of the Bowden wires 13) acts on the electric motor 30 as a load. By storing in advance the relationship between the load of the electric motor 30 and the brake operation force, the level of the brake operation force can be controlled at any target value based on the level of the load of the electric motor 30 (for example, the value for current of the electric motor 30 detected by the current sensor 29c).

Furthermore, since the ball screw mechanism 49 has a good transmission efficiency due to a low degree of frictional force and a low level of rattling, sufficient responsiveness can be secured even when a small and light electric motor 30 is used, and the noise during actuation can be reduced. Furthermore, since the dimensions of the ball screw mechanism 49 are smaller than those of a reduction gear mechanism, the overall dimensions of the electric parking brake device 12 can be reduced.

When the electric parking brake device 12 is thus actuated to generate required braking forces in the left and right wheel brakes 11, the electric motor 30 is stopped and the coil 63 of the electromagnetic brake 33 is demagnetized, thereby clamping the rotor 65 between the armature 67 and the plate 66 due to the biasing force of the first coil springs 68 and restraining rotation of the screw shaft 47. In this way, even when the tensions of the Bowden wires are transmitted back to the screw shaft 47 of the ball screw mechanism 49, it is possible to reliably prevent the screw shaft 47 from arbitrarily rotating to prevent the braking forces of the wheel brakes 11 from slackening.

Moreover, the armature 67 is driven by the electromagnetic brake 33 so as to generate the frictional forces between the plate 66 and armature 67 and the rotor 65, thus controlling the rotation of the screw shaft 47. Therefore, in comparison with a case where rotation preventing means such as a ratchet mechanism is employed, the inertial force of the electric motor 30 can be controlled appropriately, thereby controlling the stop position precisely. Moreover, since the restraint and release of restraint of the rotor 65 are carried out gradually via a frictional force, the noise of the operation can be reduced.

When the EPB ECU 21 outputs a command to release the electric parking brake device 12, firstly the coil 63 of the electromagnetic brake 33 is excited to release the restraint of the screw shaft 47, the electric motor 30 is driven in a direction opposite to the above direction to rotate the screw shaft 47 of the ball screw mechanism 49 in reverse, thus retracting the nut 31 from the position shown by the solid line to the position shown by the broken line in FIG. 5, to release the actuation of the left and right wheel brakes 11.

When the electric parking brake device 12 is actuated and generates braking forces in the wheel brakes 11, if the electric motor 30 or its control system fails, since the electric parking brake device 12 cannot be released by the electric motor 30, it is necessary for the electric parking brake device 12 to be manually released by an occupant. For this purpose, as shown in FIG. 9, the hexagonal wrench 80 is inserted into the hexagonal hole 75a of the rotating shaft 75, and the rotating shaft 75 is pushed down to a second position against the biasing force of the coil spring 78, so that the drive bevel gear 79 of the rotating shaft 75 is meshed with the driven bevel gear 84 of the screw shaft 47.

Figure 10:
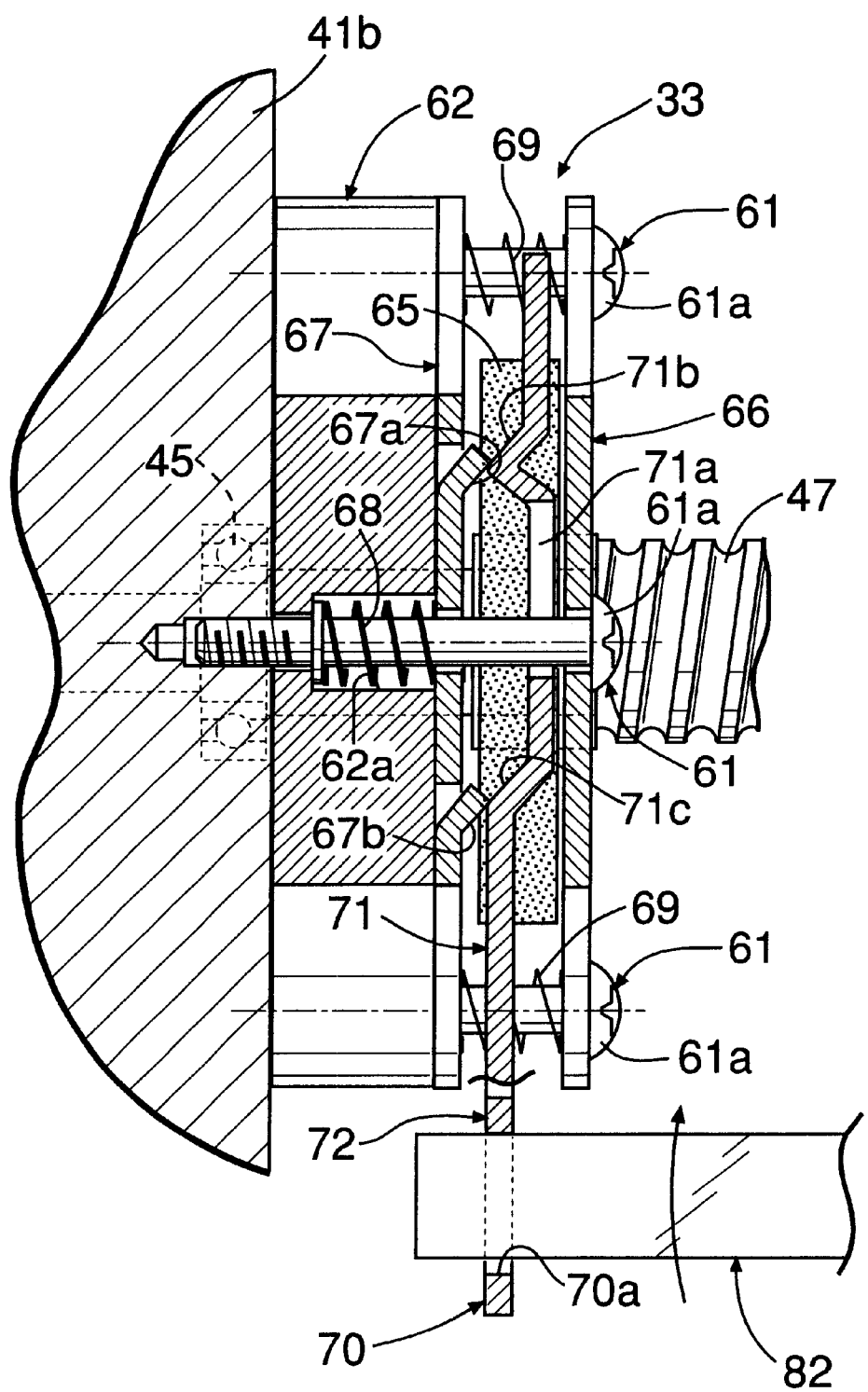

With this movement, the rear end of the lever 82 whose middle part is supported by the pin 81 is pushed down, thereby raising the forward end thereof, so that the releasing member 72 connected to the forward end thereof rises between the plate 66 and the armature 67. As a result, as shown in FIG. 10, the inclined surfaces 71b; 71c of the releasing member 72 ride on the inclined surfaces 67a; 67b of the armature 67, and the plate 66 and the armature 67 therefore become detached from the rotor 65 against the biasing force of the first coil springs 68, so that the electromagnetic brake 33 is manually released without exciting the coil 63.

Figure 9:
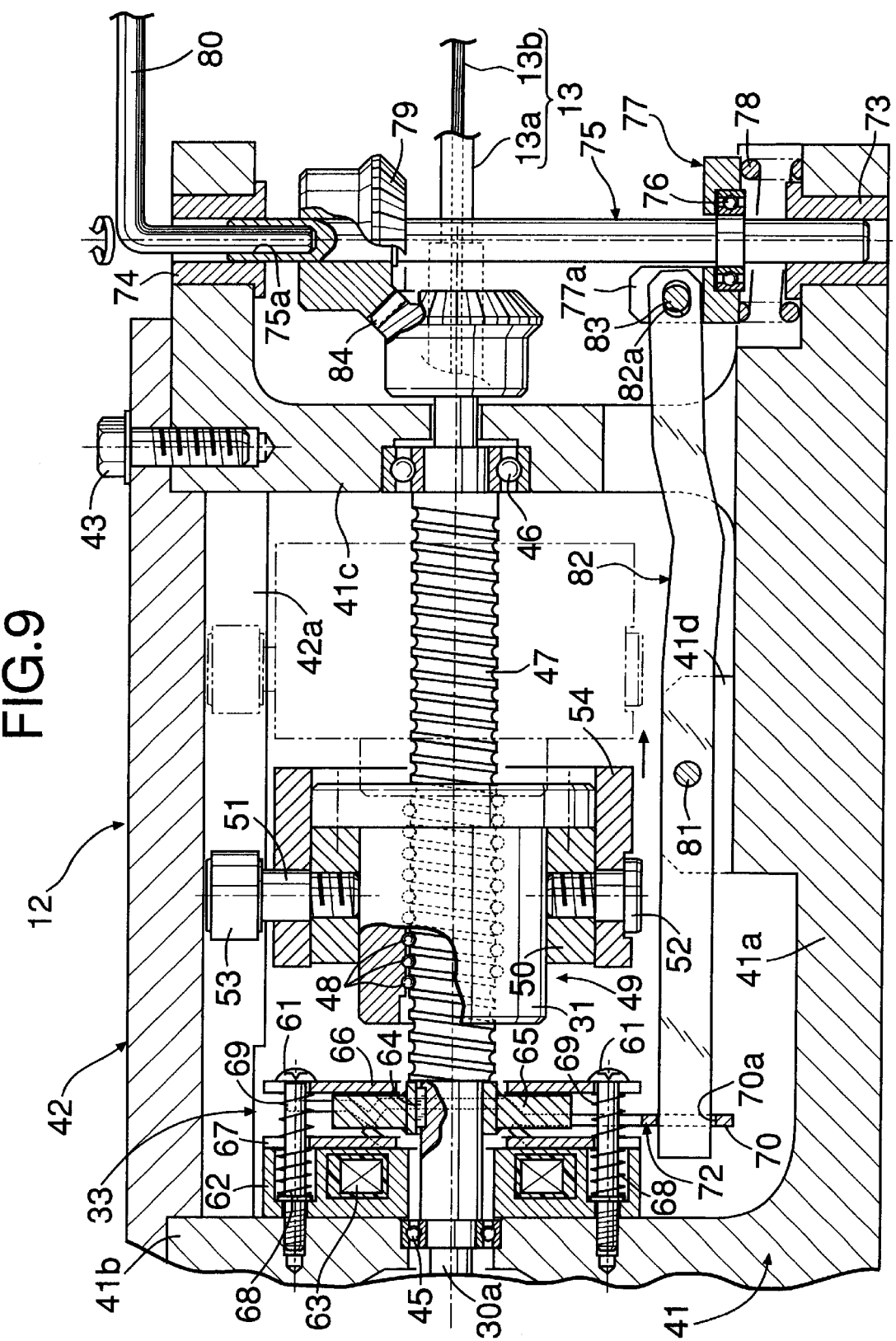

In this state, rotating the rotating shaft 75 by operating the hexagonal wrench 80 can rotate the screw shaft 47 via the drive bevel gear 79 and the driven bevel gear 84 which are meshed with each other, to move the nut 31 from the position shown by the solid line to the position shown by the broken line in FIG. 9, thereby slacking the Bowden wires 13 and releasing the wheel brakes 11.

It is of course possible to actuate the electric parking brake device 12 by a manual operation using the hexagonal wrench 80 as described above, when the electric motor 30 fails and is incapable of actuating the electric parking brake device 12. In this case, rotating the hexagonal wrench 80 in a direction opposite to the above direction moves the nut 31 from the position shown by the broken line to the position shown by the solid line in FIG. 9.

As described above, when the electric motor 30 or its control system fails, a simple operation of merely inserting the hexagonal wrench 80 into the hexagonal hole 75a of the rotating shaft 75 and rotating while pushing it downward can manually actuate and release the electric parking brake device 12, thereby greatly enhancing the convenience.

Figure 11:
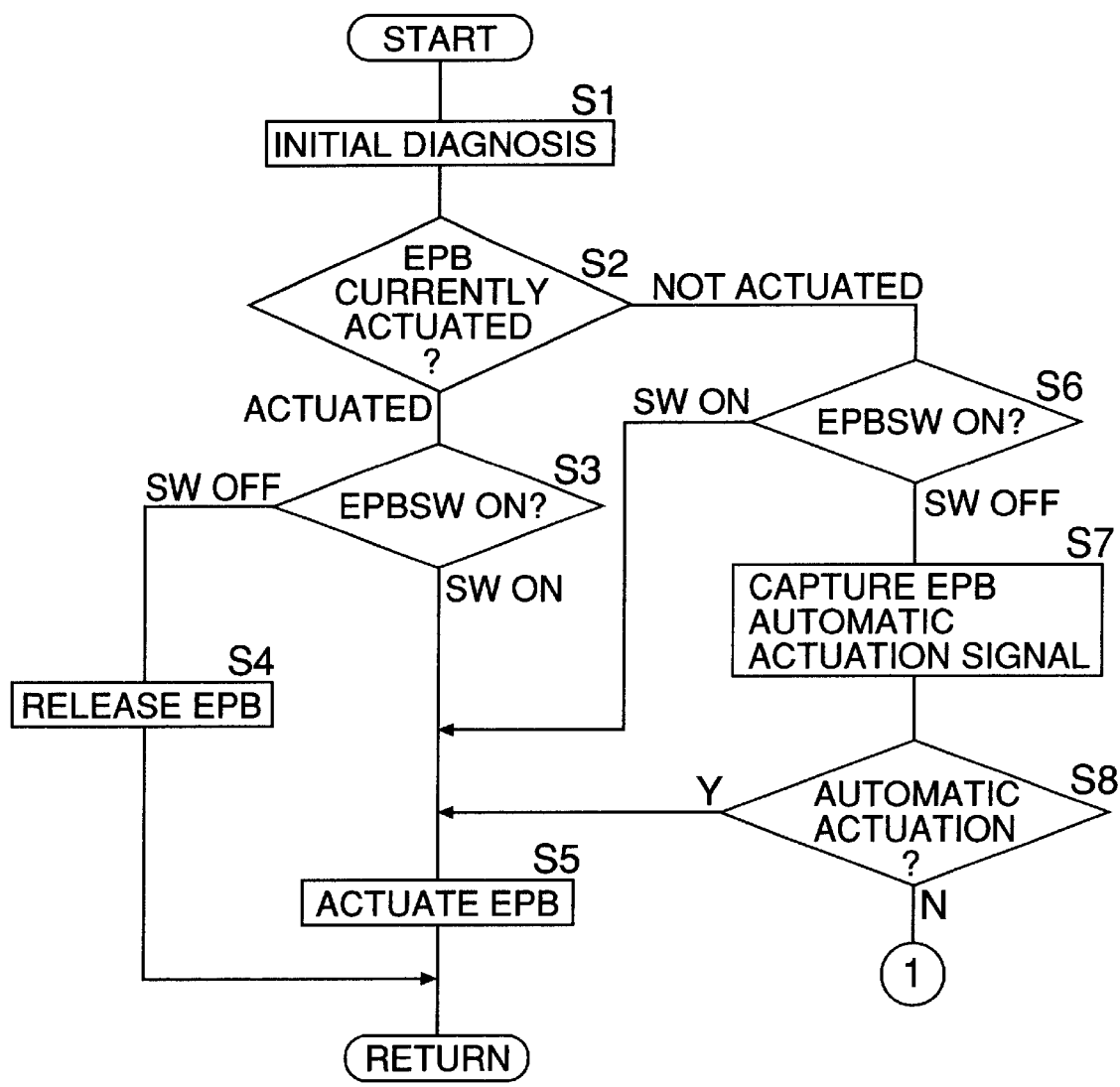
Figure 12:
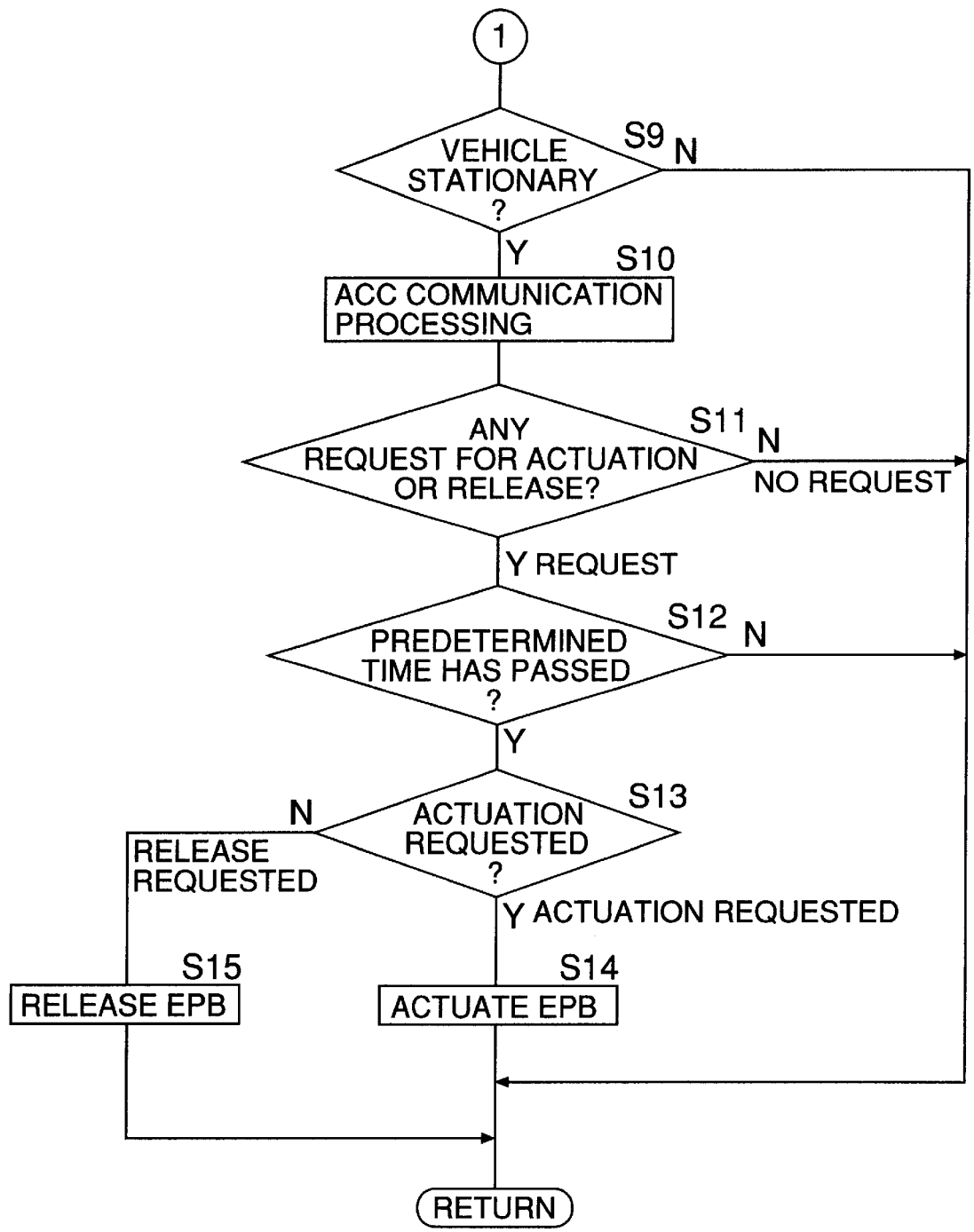

Next, control of the electric parking brake device 12 by the EPB ECU 21 is explained by reference to the flow charts of FIGS. 11 and 12. In the flow charts, the mode changeover switch 29a selects auto mode.

Firstly, in step S1, an output from each of the sensors 29c to 29h is compared with an upper limit value and a lower limit value, the states of the sensors 29c to 29h are checked as to whether the output is between the upper limit value and the lower limit value, and the state of the electric motor 30 is checked by passing a very low current through the electric motor 30 and examining whether or not it operates normally. If, in the subsequent step S2, the electric parking brake device 12 is at that time in an actuated state, and in step S3 the actuate/release switch 29b is off, that is, the driver is manually commanding the release of the electric parking brake device 12, the electric parking brake device 12 is released in step S4; if, in step S3, the actuate/release switch 29b is on, that is, the driver is manually commanding the actuation of the electric parking brake device 12, the electric parking brake device 12 is actuated in step S5 to increase (augment) the braking force.

If, in step S2, the electric parking brake device 12 is at that time in a released state, and in step S6 the actuate/release switch 29b is on, that is, the driver is manually commanding the actuation of the electric parking brake device 12, the electric parking brake device 12 is actuated in step S5. Furthermore, if, in step S6 the actuate/release switch 29b is off, that is, the driver is manually commanding the release of the electric parking brake device 12, in step S7 the EPB ECU 21 reads various signals, and in step S8 it is determined based on the signals whether or not the electric parking brake device 12 is to be actuated.

That is, the main CPU 23 of the EPB ECU 21 determines the necessity of actuation of the electric parking brake device 12 based on, for example, the inclination of a road surface detected by the inclination sensor 29e, the longitudinal acceleration detected by the longitudinal acceleration sensor 29f, the wheel speed detected by the wheel speed sensor 29g, the master cylinder pressure of the hydraulic brake system detected by the master cylinder pressure sensor 29h, the operational state of the brake pedal detected by the brake switch 29i; and the degree of opening of the accelerator, the shift position, the idle stop, and the brake control signal that have been input from external ECUs. As one example of the determination, when the wheel speed detected by the wheel speed sensor 29g is 0, the degree of opening of the accelerator input from the external ECU is 0, and the brake switch 29i is on, it is determined that automatic actuation of the electric parking brake device 12 is required, and in step S5 the electric parking brake device 12 is actuated. When determining the necessity of actuation of the electric parking brake device 12, the inclination of the road surface detected by the inclination sensor 29e can be taken into consideration, and if the road surface is flat it may be determined that automatic actuation of the electric parking brake device 12 is needed.

When it is determined whether or not the electric parking brake device 12 is to be actuated in step S8, a necessary braking force is calculated. This necessary braking force is calculated based on the master cylinder pressure of the hydraulic brake system detected by the master cylinder pressure sensor 29h, that is, the degree of foot pressure applied by the driver to the brake pedal, but it is also possible to correct the necessary braking force based on the inclination of the road surface detected by the inclination sensor 29e.

When it is determined in step S8 that automatic actuation of the electric parking brake device 12 is unnecessary, if the vehicle is stationary in step S9, in step S10 a signal from the ACC system ECU 1 is captured by the EPB ECU 21. The signal so captured in step S11 is a signal to request actuation of the electric parking brake device 12 or a signal to request release thereof, and in step S12 when a predetermined time has passed with the signal to request actuation or the signal to request release, if in step S13 the signal is to request actuation, the electric parking brake device 12 is actuated in step S14, and if in step S13 the signal is to request release, the electric parking brake device 12 is released in step S15.

Figure 13:
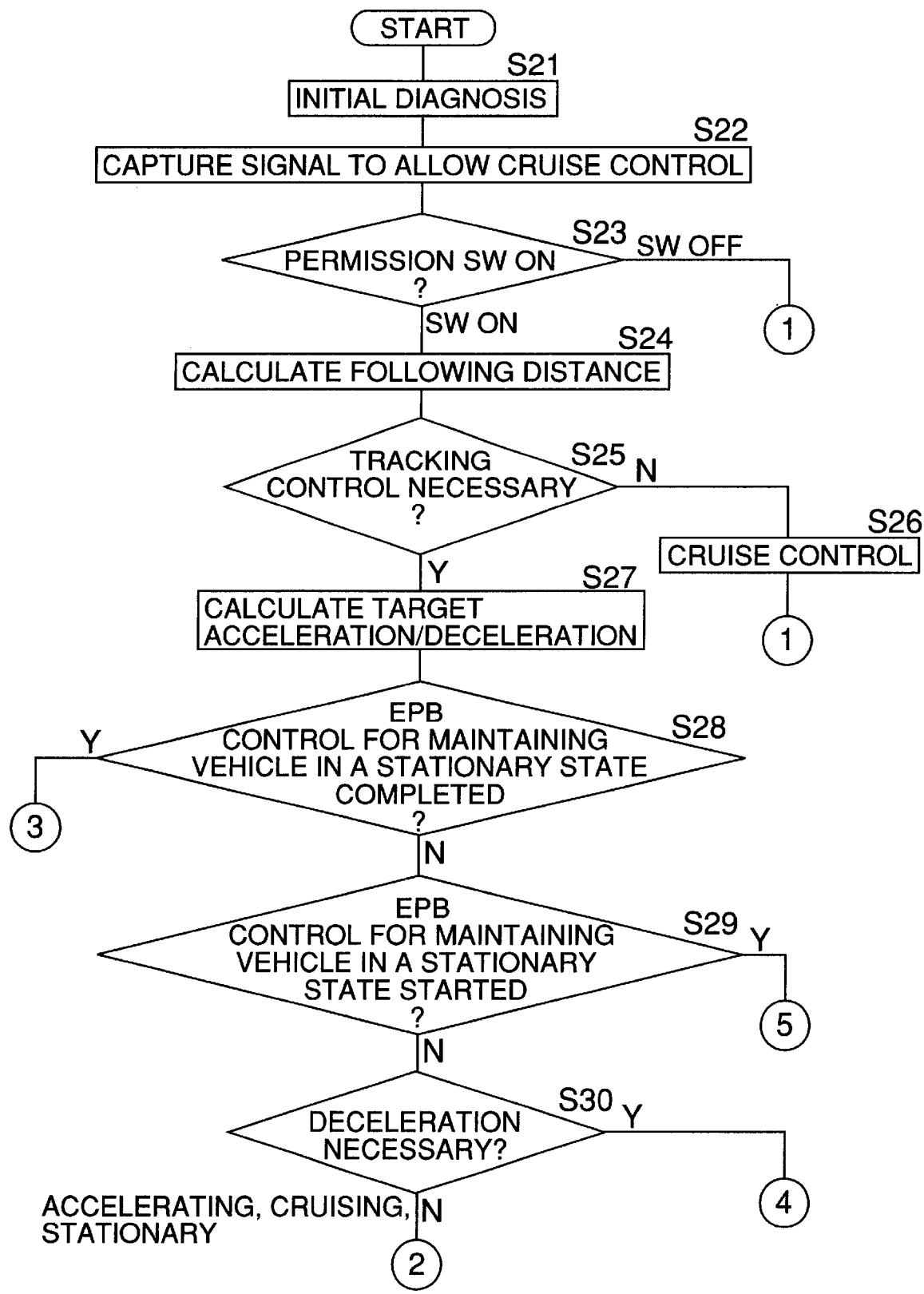

Next, control of the ACC system by the ACC system ECU 1 is explained by reference to the flow charts of FIGS. 13 and 14.

Firstly, in step S21 initial diagnoses of the preceding vehicle detection means 2, the brake actuator 3, the throttle actuator 4, etc. are carried out. After that, in step S22 a signal from a switch for allowing operation of the ACC system is captured, and if in step S23 operation of the ACC system is allowed, in step S24 a following distance from a preceding vehicle detected by the preceding vehicle detection means 2 is calculated. If, in step S25, it is determined that the tracking control (constant following distance control) is unnecessary because of the following distance being large, in step S26 cruise control (constant vehicle speed control) is carried out at a set vehicle speed. If, in step S25, it is determined that tracking control is necessary because of the following distance being small, in step S27 a necessary target acceleration/deceleration is calculated in order to make the following distance coincide with a set following distance.

If, in the subsequent step S28, control of the electric parking brake device 12 for maintaining the vehicle in a stationary state is incomplete, in step S29 control of the electric parking brake device 12 for maintaining the vehicle in a stationary state has not been started, in step S30 deceleration of the vehicle is unnecessary, in step S31 the vehicle is not in a stationary state, and in step S32 acceleration is necessary, then in step S33 the throttle valve 6 is opened by the throttle actuator 4 so as to accelerate the vehicle. If, in step S32, acceleration is unnecessary, in step S34 the degree of opening of the throttle valve 6 is maintained. If, in step S31, the vehicle is in a stationary state, in step S35 the ACC system ECU 1 sends, to the EPB ECU 21, a signal to request actuation of the electric parking brake device 12.

If, in step S28, control of the electric parking brake device 12 for maintaining the vehicle in a stationary state is complete, and in step S36 the preceding vehicle has started, then in step S37 the ACC system ECU 1 sends, to the EPB ECU 21, a signal to request release of the electric parking brake device 12. Furthermore, if in step S38 release of the electric parking brake device 12 is complete, in step S39 the throttle valve 6 is opened by the throttle actuator 4 to start the vehicle so as to keep pace with the preceding vehicle.

If, in step S30, it is determined that deceleration of the vehicle is necessary and, in step S40, use of the regular brake device 5 is unnecessary, in step S41 the throttle valve 6 is closed by the throttle actuator 4 so as to decelerate the vehicle. If, in step S40, use of the regular brake device 5 is necessary, in step S42 the regular brake device 5 is actuated by the brake actuator 3 so as to decelerate the vehicle.

If, in step S29, control of the electric parking brake device 12 for maintaining the vehicle in a stationary state has been started, in step S43 the ACC system ECU 1 receives a signal from the EPB ECU 21 that actuation of the electric parking brake device 12 is complete. If, in step S44, actuation of the electric parking brake device 12 is complete, in step S45 actuation of the service brake system 5 is ended.

FIG. 15 shows a time chart in which, after a vehicle tracking a preceding vehicle automatically decelerates and stops, the vehicle automatically moves off to track the preceding vehicle moving off.

The brake actuator 3 is actuated by a command from the ACC system ECU 1, and the braking force generated by the regular brake device 5 automatically decelerates the vehicle. When the vehicle is in a stationary state, the ACC system ECU 1 outputs, to the EPB ECU 21, a signal to request actuation of the electric parking brake device 12. When a predetermined period of time (e.g., 300 msec) has passed after outputting the actuation request signal, a command from the EPB ECU 21 energizes the electric motor 30 and the electromagnetic brake 33 so as to actuate the electric parking brake device 12. When the actuation request signal from the ACC system ECU 1 ends, energizing of the electric motor 30 and the electromagnetic brake 33 also ends, and the EPB ECU 21 outputs a signal of completion of actuation of the electric parking brake device 12 to the ACC system ECU 1. Based on the actuation completion signal from the EPB ECU 21, the ACC system ECU 1 drives the brake actuator 3 so as to release the regular brake device 5.

In response to the preceding vehicle moving off, the ACC system ECU 1 outputs, to the EPB ECU 21, a signal to request release of the electric parking brake device 12. When a predetermined period of time (e.g., 300 msec) has passed after the output, a command from the EPB ECU 21 energizes the electric motor 30 and the electromagnetic brake 33 so as to release the electric parking brake device 12. When the release request signal from the ACC system ECU 1 ends, energizing of the electric motor 30 and the electromagnetic brake 33 also ends, and the EPB ECU 21 outputs to the ACC system ECU 1 a signal of end of control of the electric parking brake device 12. Based on the end of control signal from the EPB ECU 21, the ACC system ECU 1 drives the throttle actuator 4 so as to start the vehicle.

As described above, once the electric parking brake device 12 is actuated by energizing the electric motor 30 and the electromagnetic brake 33, even if the flow of current through the electric motor 30 and the electromagnetic brake 33 is cut off, the braking force can be maintained. Consequently, when the vehicle is stopped by the ACC system, releasing the regular brake device 5 and instead actuating the electric parking brake device 12 can maintain the braking force, thereby minimizing both the power consumed for generating the braking force and the electrical heat generated by the electric motor 30 and the electromagnetic brake 33.

An embodiment of the present invention has been described in detail above, but the present invention can be modified in a variety of ways without departing from the spirit and scope of the invention.

EFFECTS OF THE INVENTION

As described above, in accordance with the first aspect of the present invention, the brake control means suspends operation of the regular brake device, and actuates the electric parking brake device, when maintaining the vehicle in a stationary state after the vehicle has been stopped. Since the electric parking brake device generates a braking force electrically and then maintains the braking force mechanically, neither the regular brake device nor the electric parking brake device consume electric power while the vehicle continues to be stationary, thereby saving power and minimizing electrical heat generation.

What is claimed is:

1. A parking brake apparatus for a vehicle, comprising:
   an electrically actuated cable tensioning device for adjusting a tension applied to a pair of cables;
   a mechanical tension holding device for maintaining tension on said cables;
   wherein said tension holding device is operable to mechanically maintain a selected tension on said cables, without consuming power and substantially without generating heat,
   wherein the mechanical tension holding device comprises an armature, a plate spaced away from said armature, a rotor sandwiched between said armature and said plate, and a plurality of first springs abutting against said armature, wherein said first springs are normally biased to push said armature against said rotor to prevent rotation thereof.

2. The parking brake apparatus of claim 1, wherein said cable tensioning device comprises:
   an electric motor;
   a threaded shaft which is operatively connected to said electric motor;
   a ball screw mechanism threadably attached to said threaded shaft; and
   an equalizer for attachment to said cables, said equalizer operatively attached to said ball screw mechanism for concurrent movement therewith.

3. The parking brake apparatus of claim 1, further comprising a releasing member comprising a plurality of second springs which are weaker than said first springs, a hollow core adjacent said armature and a coil within said core,
   wherein said coil is operable, when energized, to pull said armature in a direction opposite to the biasing force of said first springs.

4. A vehicle control system, comprising:
   an adaptive cruise control electronic control unit;
   an electronic parking brake electronic control unit; and
   a parking brake apparatus for a vehicle, comprising:
      an electrically actuated cable tensioning device for adjusting a tension applied to a pair of cables;
      a mechanical tension holding device for maintaining tension on said cables;
      wherein said tension holding device is operable to mechanically maintain a selected tension on said cables, without consuming power and substantially without generating heat,
      wherein the mechanical tension holding device comprises an armature, a plate spaced away from said armature, a rotor sandwiched between said armature and said plate, and a plurality of first springs abutting against said armature, wherein said first springs are normally biased to push said armature against said rotor to prevent rotation thereof.

* * * * *